Aug. 14, 1945.   E. GENTE   2,382,706
SEALING ARRANGEMENT FOR CENTRIFUGAL MACHINES
Filed Sept. 29, 1941
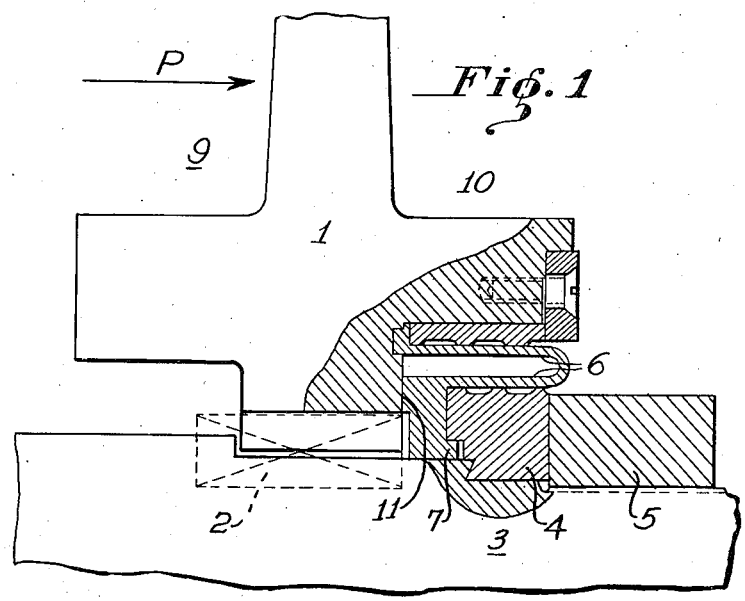
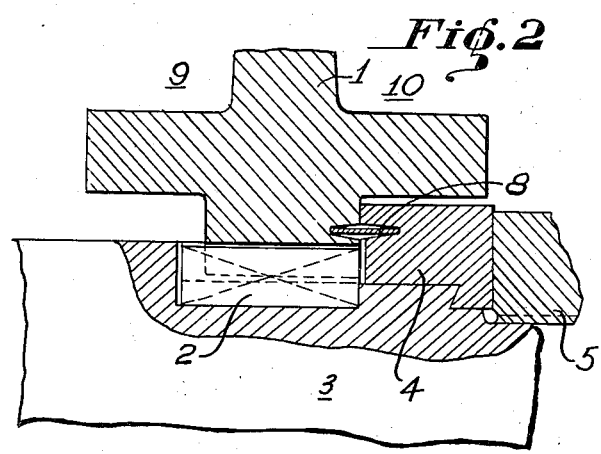
Inventor:
ERNST GENTE
Attorney.

Patented Aug. 14, 1945

2,382,706

UNITED STATES PATENT OFFICE 2,382,706

SEALING ARRANGEMENT FOR CENTRIFUGAL MACHINES

Ernst Gente, Berlin-Siemensstadt, Germany; vested in the Alien Property Custodian Application September 29, 1941, Serial No. 412,906
In Germany August 21, 1940

7 Claims. (Cl. 253—39)

This invention relates to a sealing arrangement for centrifugal machines.

In centrifugal machines, particularly in steam turbines with radial admission of the working medium it may often occur that disks exposed to a lateral overpressure not only must give up or absorb work, but that they seal at the same time the space in which a higher pressure prevails with respect to the space in which lower pressure prevails without thereby preventing the disks from freely expanding. The solution of the problem resulting therefrom is not always simple. The resilient ring body secured to the disk and shaft and which establishes a steam-tight seal between the two spaces, the pressure in the one space differing in value from that in the other space, has hitherto given satisfactory results. By the invention it is possible to avoid such additional sealing members or if they are to be retained for the sake of safety they must be so relieved of pressure that they may be designed considerably thinner so as to reduce the weight to a great extent, that is to say they oppose a correspondingly smaller resistance to the disk when being expanded. The solution of the invention consists in utilizing the overpressure itself so as to bring about the seal by providing an arrangement in which the disk is pressed against a continuous sealing surface of a ring mounted on the shaft, the sealing surface being so dimensioned that even in the case of the slightest overpressure to be expected in operation the surface pressure necessary for a proper seal does not fall below a given value. It is therefore the overpressure itself which replaces the sealing member hitherto employed.

As already mentioned the invention does not exclude the use of a sealing member, if it is believed that such a member cannot be dispensed with for certain reasons. In this case the sealing member may assume the form of a simple cylinder; however, it may also consist as has hitherto been usual of a resilient ring body. In the drawing: Fig. 1 is a section of the shaft and the disk embodying one form of the invention. Fig. 2 is a similar view of another form. In the disk 1 which may be, for instance, the impeller of a steam turbine with radial admission of the working medium is so secured to the shaft 3 by means of keys 2 that the transmission of the torque does not prevent the disk from expanding and vice versa. The disk 1 is exposed to lateral pressure in the direction indicated by the arrow P. The space 9 must be rendered steam-tight with respect to the space 10. To this end, a sealing surface 11 of a ring 7 mounted on the shaft 3 is employed according to the invention and is as above pointed out so dimensioned as is necessary in view of the lowest overpressure to be expected. It might be assumed that an increase of the sealing surface would be unobjectionable. However, if the surface is too large the specific contact pressure becomes under circumstances so small that a sealing between the spaces 9 and 10 is no longer ensured. It is therefore essential that the specific surface pressure should not decrease below a value resulting from the operating conditions of the steam turbine.

However, for the sake of safety, the resilient ring 6 is in the present case in addition employed which is worked out from the material of the ring 7 and is held in position by the intermediate ring 4 and the nut 5. As already mentioned, the resilient ring 6 is not absolutely necessary, but it only secures the seal brought about by the surface 11.

Fig. 2 shows an arrangement of a modified form of the additional sealing member. In this case, the sealing member is designed in the form of a simple cylinder 8 connecting the disk 1 and the ring 4, and which may be so thin that the deformation occurring does not influence the expansion of the disk 1. The inclined position of the disk 1, caused by the lateral overpressure and the effect of the centrifugal force of the disk bring about two opposed movements at the sealing point. If the two movements are equal no stress whatever occurs at the sealing body, since the radial displacement is zero.

The sealing body need not present a plane surface but may also be arcuate.

Owing to the high contact pressures to be expected it is preferable to case-harden, particularly to nitrify the supporting ring body at least at the sealing surface.

What is claimed is:

1. In a sealing arrangement for steam turbines with radial admission of the working medium, the combination of a disk limiting the space to be sealed, and exposed to a lateral overpressure, said disk being provided with a sealing surface; and a ring mounted on the turbine shaft and provided with a continuous surface against which the sealing surface of the disk is pressed by the lateral overpressure, said sealing surface of the ring being dimensioned in such a manner that it produces the surface pressure necessary for the seal in the case of the smallest overpressure to be expected in operation.

2. In a sealing arrangement for steam turbines with radial admission of the working medium, the combination of a disk limiting the space to be sealed, and exposed to a lateral overpressure, said disk being provided with a sealing surface; a ring mounted on the turbine shaft and provided with a continuous sealing surface against which the sealing surface of the disk is pressed by the lateral overpressure, said sealing surface of the ring being dimensioned in such a manner that it produces the surface pressure necessary for the seal in the case of the smallest overpressure to be expected in operation; and an auxiliary sealing member connecting the disk and the ring to supplement the sealing.

3. In a sealing arrangement as set forth in claim 2, the auxiliary sealing member having the form of a simple thin-walled cylinder.

4. In a sealing arrangement as set forth in claim 2, the auxiliary sealing member being in the form of a resilient ring.

5. In a sealing arrangement as set forth in claim 2, the said sealing surface of the ring and the auxiliary sealing member being worked out from the body of the said ring.

6. In a sealing arrangement as set forth in claim 2, the said ring being subjected, at least as to its sealing surface, to a surface treatment, particularly, being nitrified.

7. In a sealing arrangement as set forth in claim 2, the auxiliary sealing member, viewed from the side of the overpressure, lying behind the said sealing surfaces.

ERNST GENTE.